United States Patent

Jones

[11] Patent Number: 6,060,686
[45] Date of Patent: May 9, 2000

[54] UNDERWATER LASER WELDING NOZZLE

[75] Inventor: Marshall Gordon Jones, Scotia, N.Y.

[73] Assignee: General Electric Company, Schenectady, N.Y.

[21] Appl. No.: 08/916,811

[22] Filed: Aug. 22, 1997

Related U.S. Application Data

[60] Provisional application No. 60/028,179, Oct. 15, 1996.
[51] Int. Cl.[7] .......................... B23K 26/12; B23K 26/14
[52] U.S. Cl. ............................. 219/121.84; 219/121.63
[58] Field of Search .................... 219/121.63, 121.64, 219/121.84

[56] References Cited

U.S. PATENT DOCUMENTS

| | | | |
|---|---|---|---|
| 4,564,736 | 1/1986 | Jones et al. | 219/121.63 |
| 5,293,023 | 3/1994 | Haruta et al. | 219/121.84 |
| 5,408,065 | 4/1995 | Campbell et al. | 219/121.84 |
| 5,500,504 | 3/1996 | Jagiella et al. | 219/121.7 |
| 5,601,738 | 2/1997 | Engelhardt et al. | 219/121.84 |
| 5,786,561 | 7/1998 | Zefferer et al. | 219/121.84 |
| 5,938,954 | 8/1999 | Onuna et al. | 219/121.84 |

FOREIGN PATENT DOCUMENTS

| | | |
|---|---|---|
| 3-146286 | 6/1991 | Japan . |
| 4-147786 | 5/1992 | Japan . |
| 5-57470 | 3/1993 | Japan . |
| 9-10979 | 1/1997 | Japan . |
| 9-10981 | 1/1997 | Japan . |

OTHER PUBLICATIONS

White et al., "Underwater Cladding With Laser Beam and Plasma Arc Welding," Welding Journal, Jan. 1997, pp. 57–61.
Lumonics Corp., "JK MultiWave Laser," Jul. '92, 2–page brochure.
Translation of Japan Patent Application 7–299,574 PTO 99–4632, Aug. 1999.
"Development of Underwater Welding with high power YAG laser" by Kojima et al., Published in Ishikawajima—Harima Engineering Review (Jul. 1997), vol. 37, No. 4, p.303–308.
Translation of "Development of Underwater Welding with high power YAG Laser" by Kojima et al., Aug. 1998.

*Primary Examiner*—Geoffrey S. Evans
*Attorney, Agent, or Firm*—Marvin Snyder; Douglas E. Stoner

[57] ABSTRACT

A nozzle for delivering a laser beam to a workpiece under water includes a hollow plenum having an axially spaced apart inlet and outlet, with a gas port disposed therebetween. The laser beam is delivered through the inlet and outlet toward a localized melting zone on the workpiece. A pressurized cover gas is delivered into the gas port for discharge through the outlet to cover the melting zone. The outlet is sized to discharge the gas as a jet for opposing pressure of the water to locally exclude the water at the melting zone.

15 Claims, 2 Drawing Sheets

UNDERWATER LASER WELDING NOZZLE

This application claims the benefit of U.S. Provisional Application No. 60/028,179, filed Oct. 15, 1996.

BACKGROUND OF THE INVENTION

The present invention relates generally to underwater welding, and, more specifically, to underwater laser welding.

Underwater welding techniques are used in building and repair of off-shore oil rigs, ships, nuclear reactors, and other similar applications. In many cases, a manual arc welding procedure is used, meaning that an individual is performing the underwater welding operation. Manual underwater welding is often required when there is limited access to the welding region.

There are also many cases where underwater welding is effected by remote robotic control. Operator safety is greatly enhanced when robotically controlled underwater welding is used. This is especially true for welding operators when addressing certain repair procedures within the nuclear industry. This is also true when addressing potential mitigation issues in the irradiated region of a nuclear reactor. Such mitigation issues include the concerns of stress corrosion cracking (SSC) of nuclear reactor components in both the irradiated and non-irradiated regions of the reactor.

Many arc related techniques are adaptable to performing surfacing, joining, and removal operations underwater. For welding or cladding underwater, the following are a few among many that have proven to be effective: plasma transferred arc (PTA), gas tungsten metal arc (GTMA), and tungsten inert gas (TIG).

Laser welding or cladding is also an approach. In particular, laser surface cladding is a process in which powder or wire of different compositions is delivered into the laser-generated melt pool, and the powder or wire is also melted by the laser beam. A thin or thick layer of clad alloy is formed having a chemistry that is different from the substrate.

The main purpose of the laser cladding process is to overlay the surface of a substrate with another material having a different chemistry by melting a thin or thick interfacial layer to produce a metallurgical bond with minimum dilution of the clad layer. Among the advantages of this technique are production of novel alloys, minimized clad dilution, reduced alloy material loss, reduced machining, and reduced distortion.

Conventional laser welding occurs in a gas environment, typically using a suitable inert cover gas. Therefore, conventional laser welding will not work underwater because the water environment affects the laser beam and cover gas, and rapidly removes heat from the work zone. Accordingly, an apparatus specifically configured to allow underwater welding with a laser beam is desired for enjoying the benefits associated with such welding.

SUMMARY OF THE INVENTION

A nozzle for delivering a laser beam to a workpiece under water includes a hollow plenum having an axially spaced apart inlet and outlet, with a gas port disposed therebetween. The laser beam is delivered through the inlet and outlet toward a localized melting zone on the workpiece. A pressurized cover gas is delivered into the gas port for discharge through the outlet to cover the melting zone. The outlet is sized to discharge the gas as a jet for opposing pressure of the water to locally exclude the water at the melting zone.

DESCRIPTION OF THE PREFERRED EMBODIMENT(S)

Figure 1:
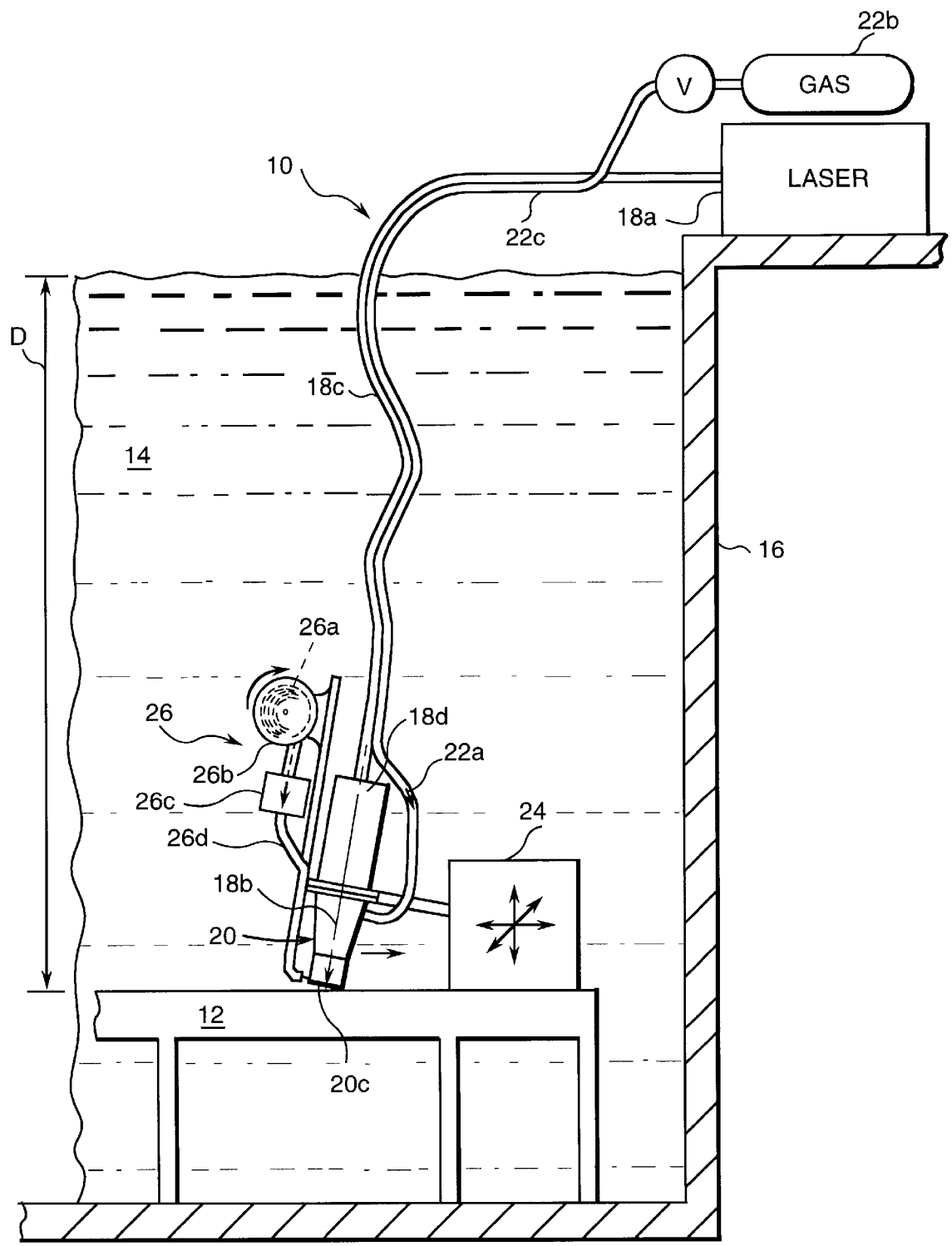
FIG. 1 is a schematic representation of a laser underwater welding apparatus including a submergible welding nozzle in accordance with one embodiment of the present invention.

FIG. 1 illustrates a laser welding apparatus 10 configured for underwater welding or cladding of a workpiece 12. Although workpiece 12 is illustrated as a component disposed under water 14 in a nuclear reactor vessel 16, the invention may be used in any underwater welding or cladding process.

Welding apparatus 10 includes a conventional laser 18a suitably powered for producing and delivering a coherent optical beam, or laser beam, 18b to workpiece 12 for localized melting of the workpiece underwater. The beam may be used for typical welding or cladding as desired. In a preferred embodiment, laser 18a is a continuous wave (CW), neodymium doped yttrium-aluminum-garnet (Nd:YAG) laser, commercially available, for example, from the Lumonics Corp., of Livonia, Mich., as Model MW 2000. Apparatus 10 is effective for underwater cladding of workpiece 12 to mitigate stress corrosion cracking of nuclear reactor components in both irradiated and non-irradiated regions of the reactor.

Because of its shorter wavelength of 1.06 microns, the Nd:YAG laser beam 18b couples more effectively with metal than the laser beam of a carbon dioxide ($CO_2$) laser having a wavelength of 10.6 microns. This translates into less energy needed to apply the required amount of cladding material. Because yttrium-aluminum-garnet or YAG lasers can be readily coupled with fiber optics, the ability to deliver the laser beam to the work surface underwater, and the ability to access difficult to reach regions, are greatly enhanced. The YAG laser and fiber optic technologies provide much more flexibility than available with $CO_2$ lasers which require the use of hard optics for laser beam delivery.

Welding apparatus 10 preferably includes a conventional flexible fiber optic cable 18c optically joined at one end to laser 18a and having sufficient length and flexibility for routing under water 14 to a sufficient depth D to reach the applicable workpiece 12. Cable 18c is effective for carrying or transmitting laser beam 18b through the water to reach workpiece 12. In this regard, the opposite end of cable 18c includes a conventional optical coupler 18d optically joined to cable 18c for receiving laser beam 18b.

Coupler 18d is joined to a cooperating welding nozzle 20 through which the laser beam 18b is transmitted to workpiece 12 and protected from the underwater environment. To obtain a high metallurgical quality cladding when processing underwater, it is essential to locally exclude water in situ from the immediate region undergoing cladding. To address this critical need, laser beam welding nozzle 20 is specifically configured to exclude water from a sufficient surface area to ensure an acceptable cladding application suitably free of undesirable voids or cracks. Of course, cable 18c, coupler 18d, and welding nozzle 20 itself are suitably waterproofed to prevent water contamination thereof, ensuring effective delivery of laser beam 18b to the work site.

Figure 2:
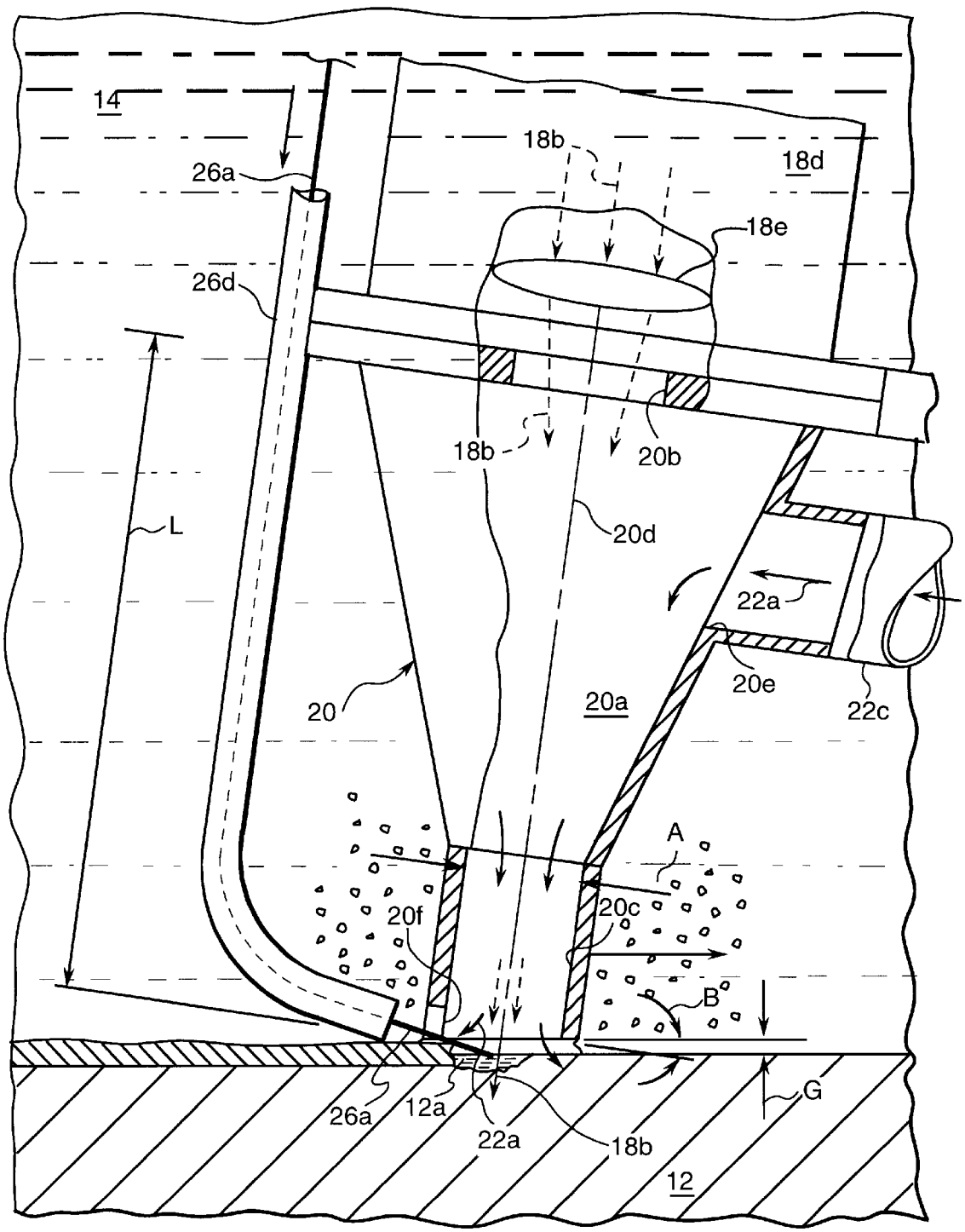
FIG. 2 is a partly sectional elevation view of a portion of the welding nozzle illustrated in FIG. 1.

FIG. 2 illustrates in greater particularity an exemplary embodiment of welding nozzle 20 including optical coupler 18d. Nozzle 20 extends from coupler 18d and includes a tubular hollow plenum 20a having an inlet 20b and an outlet 20c in the exemplary form of circular apertures coaxially aligned and axially spaced apart along a longitudinal centerline axis 20d. Nozzle 20 also includes a side-entry gas port 20e suitably disposed at a convenient location between the beam inlet and outlet 20b,c.

Nozzle 20 remains waterfree in operation during which laser beam 18b is delivered from coupler 18d through nozzle plenum inlet 20b and nozzle outlet 20c toward a localized work or melting zone 12a on workpiece 12.

In order to exclude water 14 from melting zone 12a during welding operation, suitable means are provided for delivering a conventional cover gas 22a into plenum 20a through gas port 20e under sufficient pressure for discharge through outlet 20c to both cover melting zone 12a and exclude the water therefrom. Cover gas 22a may comprise any conventional gas which is nonreactive with the material composition of workpiece 12 and may include, for example, argon or nitrogen. As shown in FIG. 1, cover gas 22 may be initially stored under high pressure in a conventional gas tank 22b outside vessel 16, and suitably regulated through use of a valve in a flexible delivery tube 22c which is long enough to extend to the required depth in the vessel to reach nozzle 20 to which it is sealingly joined through gas port 20e.

As shown in FIG. 2, nozzle outlet 20c is preferably of circular cross-section with an inner diameter A specifically sized to effect an outlet flow area to discharge the pressurized gas 22a as a jet for opposing pressure of water 14 to locally exclude the water at melting zone 12a during welding or cladding. Nozzle is positioned adjacent to workpiece 12 and is specifically sized and configured to discharge gas jet 22a with sufficient velocity and pressure to exclude water 14 at melting zone 12a, thereby allowing performance of dry welding or cladding without being adversely affected by water.

During operation, flow of the cover gas is initiated through nozzle 20, which is then positioned underwater, thus allowing the cover gas to prevent water from entering the nozzle. Laser beam 18b is then delivered through plenum 20a to melting zone 12a, and flow of cover gas 22a is maintained through plenum 20a surrounding laser beam 18b to exclude water at melting zone 12a while conventionally providing an inert gas cover.

Nozzle 20 must be specifically sized and operated to prevent excessive velocity of cover gas jet 22a which would undesirably disperse or blow away some or all of the molten material or melt within melting zone 12a. In this regard, nozzle outlet 20c is positioned above workpiece 12 to maintain a suitable standoff gap G therebetween to exclude water 14 at melting zone 12a during operation.

The required operating parameters of nozzle 20 for excluding water above melting zone 12a are determined for each application and are primarily affected by depth D of workpiece 12 underwater which determines the pressure of the water at melting zone 12a. The pressure of cover gas 22a at nozzle outlet 20c may be suitably selected in accordance with diameter A of outlet 20c to provide a suitable opposing pressure at the nozzle effective for excluding water 14 within gap G without causing dispersion of molten material at the workpiece. Gap G is preferably as small as practical within a suitable maximum limit for most effectively excluding the water at the nozzle outlet. Correspondingly, the inner diameter A of nozzle outlet 20c is preferably maximized in conjunction with the pressure of cover gas 22a for effectively excluding water 14 while minimizing the velocity of discharge gas jet 22a from nozzle outlet 20c. For example, inner diameter A is preferably greater than about ten spot sizes of the laser beam itself.

To maintain a suitable standoff gap G and to allow suitable traversing of nozzle 20 during operation, the nozzle, as illustrated in FIG. 1, is affixed to a carriage 24 suitably supported, for example, atop workpiece 12. Carriage 24 may take any conventional form, depending upon the application, such as a multi-axis machine tool having capability to traverse nozzle 20 in required directions along one, two, or three dimensions. In the example illustrated in FIG. 2, carriage 24 is effective for traversing nozzle 20 along the top of workpiece 12 for building cladding layers atop the workpiece, while maintaining a substantially uniform standoff gap G during operation. Carriage 24 is preferably remotely controlled for effecting robotic operation, and suitable underwater viewing apparatus may also be used if required for examining the welding process during operation.

As shown in FIG. 2, optical coupler 18d employs conventional optics including, for example, a focusing lens 18e which optically joins coupler 18d to nozzle plenum inlet 20b for focusing and transmitting the laser beam toward nozzle outlet 20c along, or parallel to, longitudinal axis 20d. Plenum 20a preferably converges in flow area from its top end at inlet 20b to its bottom end at outlet 20c, and has a length L therebetween sized in conjunction with focusing lens 18e to focus the laser beam at a predetermined location or spot outside nozzle outlet 20c and preferably within the standoff gap G. In the embodiment illustrated in FIG. 2, plenum 20a includes a conical portion converging from the nozzle plenum inlet 20b, and an integral cylindrical lower portion defining nozzle outlet 20c.

The inner diameter A of the nozzle cylindrical portion is smaller than the inner diameters of the conical portion so that the flow area within plenum 20a decreases at least from gas port 20e to nozzle outlet 20c. This provides the advantage of accelerating the cover gas through nozzle outlet 20c for more effectively excluding the water therefrom, and reduces the likelihood of contaminating optical coupler 18d by back travel of welding or cladding particles.

Preferably, nozzle outlet 20c is inclined at a small acute angle B from the perpendicular to longitudinal axis 20d, and nozzle 20 is similarly inclined to workpiece 12 during operation for maintaining a uniform standoff gap G over the entire extent of nozzle outlet 20c. The inclination angle B may be about 150 consistent with conventional air-laser welding or cladding so that laser beam back reflection is reduced or eliminated.

In the exemplary embodiment illustrated in FIG. 1, a filler material dispenser 26 is provided for delivering a filler material 26a to nozzle outlet 20c to be melted by laser beam 18b for use in cladding workpiece 12. Filler dispenser 26 may take any conventional form including, for example, a reel 26b which initially contains a spool of filler material 26a in wire form. A conventional driver 26c transports filler wire 26a through a suitable carrying tube 26d to nozzle outlet 20c. Filler dispenser 26 may be mounted at any convenient location, such as to nozzle 20 itself, so as to be carried along with carriage 24.

As shown in FIG. 2, nozzle 20 preferably includes a small end slot 20f through the wall of the cylindrical end portion, which is open at nozzle outlet 20c for receiving filler wire 26a therethrough during operation. In this way, filler wire 26a is initially fed inside the nozzle outlet portion of plenum 20a for the purpose of being melted by the laser beam, as well as for allowing the size of standoff gap G to be minimized. Filler wire 26a may be comprised of any composition that can effect suitable cladding of metallic workpiece 12. The wire feed allows effective cladding operation without compromising the ability of nozzle 20 to exclude water within the narrow standoff gap G at melting zone 12a.

In the embodiment illustrated in FIG. 2, standoff gap G may be within the range of 1–3 millimeters for water depths up to about 25 meters for allowing adequate room to feed the filler wire directly into melting zone 12a while suitably excluding water 14 therefrom. With the inclined nozzle outlet 20c, the nozzle itself is also correspondingly inclined from the perpendicular to workpiece 12, which minimizes the amount of back reflection of the laser beam into the optical coupler.

Welding apparatus 10 combines technologies of lasers, fiber optics, material deposition in the form of wire or powder feed, and water exclusion techniques to make possible the use of normally air-environment laser processing in an underwater environment. The laser cladding process is influenced by a number of variables and interactions of these variables such as laser power and power density, size and shape of the laser beam, scan velocity of nozzle 20 over workpiece 12, and the chemistry and metallurgy of the cladding and workpiece substrate materials. These laser-processing variables have influence on the final microstructure of the alloy produced. The overall composition and microstructure of the laser-clad materials are also affected by the degree of mixing and cooling rate.

Since nozzle 20 is traversed or scanned during operation, the water quench cools the cladding material immediately as it is deposited and passes from the water exclusion region. Due to the rapid melting, followed by rapid quenching of the cladding material, creation of fine microstructure, non-equilibrium crystalline and amorphous phases are possible using the invention. Typical laser power density levels for YAG-laser cladding are on the order of about $10^5$ to $10^6$ watts/cm$^2$.

Material-addition approaches refer to cladding or alloying. If a clad or alloy material is more affordable, or only available, in powder form rather than wire form, the invention may be suitably configured to dispense cladding powder through a conduit for cladding or alloying underwater.

Components are made for both industrial and aircraft gas turbine engines that use conventional superalloy materials that are crack sensitive to welding or to hardfacing, which is a form of cladding. By performing these welding and hardfacing processes underwater, undesirable cracking may be minimized.

Autogenous welding is welding without filler material. There may be a need to autogenously weld a component underwater in a nuclear reactor. There may also be a need to weld closed an identified crack to effect healing of such crack, for example, in a nuclear reactor. By minimizing tensile residual stress of a welded region, the chance for stress corrosion cracking in a nuclear reactor can be greatly decreased. Underwater crack repair using the invention may take advantage of compressive stresses to greatly enhance stress corrosion cracking mitigation.

The invention has been demonstrated in a laboratory environment by producing both single pass and multi-pass clad deposits at pressure levels equivalent to water depths of about 25 meters. A Nd:YAG laser operating at power levels of 1.2 to 2.0 kilowatts and at travel speeds between 25–76 centimeters per minute (10 to 30 inches per minute) successfully clad conventional Inconel IN82 wire to an Inconel IN600 substrate. A micrograph prepared for the multi-pass cladding was effectively defect-free, supporting the efficacy of the underwater laser welding nozzle 20.

What is claimed is:

1. A nozzle for delivering a laser beam to a workpiece under water for localized melting thereof, comprising:
    a hollow plenum including an inlet and an outlet coaxially aligned and axially spaced apart along a longitudinal axis, and a gas port disposed therebetween;
    first means for delivering said laser beam through said inlet and outlet toward a localized melting zone on said workpiece; and
    second means for delivering a pressurized cover gas into said gas port for discharge through said outlet to cover said melting zone;
    said outlet being sized to discharge said gas as a jet for opposing pressure of said water to locally exclude said water at said melting zone; and
    wherein said first means comprise:
        a fiber optic cable for transmitting said laser beam; and
        an optical coupler joined to said cable for receiving said laser beam, and optically joined to said plenum inlet for transmitting said laser beam toward said outlet along said longitudinal axis;
        said plenum outlet being inclined at an acute angle from perpendicular to said longitudinal axis.

2. A method of operating the nozzle of claim 1 comprising:
    delivering said laser beam through said plenum to said melting zone; and
    delivering said cover gas through said plenum to said melting zone to exclude said water at said melting zone without dispersing molten material thereat.

3. A nozzle according to claim 1 wherein said plenum converges from said inlet to said outlet, and has a length sized to focus said laser beam at a spot outside said outlet.

4. A nozzle according to claim 3 wherein said plenum includes a conical portion at said inlet, and a cylindrical portion at said outlet.

5. A nozzle according to claim 3 further comprising third means for delivering a filler material to said outlet for melting by said laser beam.

6. A nozzle according to claim 5 wherein said third means include a slot in a side of said plenum at said outlet for receiving said filler material inside said outlet.

7. A nozzle according to claim 5 wherein said first means further comprise a continuous wave Nd:YAG laser optically joined to said cable for transmitting a laser beam therethrough.

8. A method of operating the nozzle of claim 1 comprising:
    delivering said laser beam through said plenum to said melting zone;
    delivering said cover gas through said plenum to said melting zone to exclude said water at said melting zone without dispersing molten material thereat; and
    positioning said outlet above said workpiece to maintain a uniform gap therebetween limited to a maximum size.

9. A nozzle according to claim 1 further comprising means for positioning said outlet above said workpiece to maintain a uniform gap therebetween to exclude said water at said melting zone.

10. A method of operating said nozzle of claim 1 comprising:

delivering said laser beam through said plenum to said melting zone; and delivering said cover gas through said plenum to said melting zone to exclude said water at said melting zone without dispersing melt thereat.

11. A method according to claim 10 further comprising positioning said outlet above said workpiece to maintain a uniform gap therebetween to exclude said water at said melting zone.

12. A nozzle for delivering a laser beam to a workpiece under water for localized melting thereof, comprising:

a hollow plenum including an inlet and an outlet coaxially aligned and axially spaced apart along a longitudinal axis, and a gas port disposed therebetween, wherein said plenum outlet is sized in diameter greater than about ten times the size of said laser beam delivered therethrough;

first means for delivering said laser beam through said inlet and outlet toward a localized melting zone on said workpiece; and second means for delivering a pressurized cover gas into said gas port for discharge through said outlet to cover said melting zone;

said outlet being sized to discharge said gas as a jet for opposing pressure of said water to locally exclude said water at said melting zone.

13. A nozzle for delivering a laser beam to a workpiece under water for localized melting thereof, comprising:

hollow plenum including an inlet and an outlet coaxially aligned and axially spaced apart along a longitudinal axis, a gas port disposed therebetween, and a wall having a slot open at said nozzle outlet;

first means for delivering said laser beam through said inlet and outlet toward a localized melting zone on said workpiece; and second means for delivering a pressurized cover gas into said gas port for discharge through said outlet to cover said melting zone;

said outlet being sized to discharge said gas as a jet for opposing pressure of said water to locally exclude said water at said melting zone.

14. A nozzle according to claim 13 wherein the laser-delivering first means are configured to deliver said laser beam along said plenum longitudinal axis for concentrically surrounding said beam with said cover gas at said plenum outlet.

15. A nozzle according to claim 13 further comprising means for positioning said outlet above said workpiece to maintain a uniform gap therebetween to exclude said water at said melting zone.

* * * * *